United States Patent
Doglioni Majer (10) Patent No.: US 10,752,431 B2
(45) Date of Patent: Aug. 25, 2020

(54) CAPSULE AND SYSTEM FOR BEVERAGE PREPARATION

(71) Applicant: TUTTOESPRESSO S.R.L., Saronno (VA) (IT)

(72) Inventor: Luca Doglioni Majer, Carate Urio (IT)

(73) Assignee: TUTTOESPRESSO S.R.L., Saronno (VA) (IT)

( * ) Notice: Subject to any disclaimer, the term of this patent is extended or adjusted under 35 U.S.C. 154(b) by 0 days.

(21) Appl. No.: 14/360,231

(22) PCT Filed: Nov. 20, 2012

(86) PCT No.: PCT/IB2012/002408
§ 371 (c)(1),
(2) Date: May 22, 2014

(87) PCT Pub. No.: WO2013/076551
PCT Pub. Date: May 30, 2013

(65) Prior Publication Data
US 2014/0318380 A1   Oct. 30, 2014

(30) Foreign Application Priority Data

Nov. 22, 2011  (WO) .................. PCT/IB2011/002773

(51) Int. Cl.
*B65D 85/804*   (2006.01)
*A47J 31/40*    (2006.01)

(52) U.S. Cl.
CPC ........ *B65D 85/8043* (2013.01); *A47J 31/407* (2013.01)

(58) Field of Classification Search
CPC .................. B65D 85/8043; B65D 85/8046
USPC .......................................... 99/295
See application file for complete search history.

(56) References Cited

U.S. PATENT DOCUMENTS

| | | |
|---|---|---|
| 2003/0172813 A1 | 9/2003 | Schifferle |
| 2005/0223904 A1 | 10/2005 | Laigneau et al. |
| 2006/0233921 A1 | 10/2006 | Mock et al. |
| 2010/0015307 A1 | 1/2010 | Abegglen et al. |
| 2010/0064899 A1 * | 3/2010 | Aardenburg ........ A47J 31/3633 99/295 |

(Continued)

FOREIGN PATENT DOCUMENTS

| | | |
|---|---|---|
| AU | 2010236108 B2 | 7/2015 |
| CA | 2 719 126 C | 10/2018 |

(Continued)

OTHER PUBLICATIONS

International Search Report dated Mar. 1, 2013 in PCT/IB12/002408 Filed Nov. 20, 2012.

(Continued)

*Primary Examiner* — Tu B Hoang
*Assistant Examiner* — Erin E McGrath
(74) *Attorney, Agent, or Firm* — Salvi Salvadori (57) ABSTRACT

A capsule for the preparation of a beverage comprises a lateral wall, an inlet wall and a lower wall forming a hollow body having a substantially central axis, the inlet wall extends from a peripheral end of the lateral wall towards said central axis and a plurality of sunken portions are extending on both lateral and inlet walls across the edge between said walls each portion connecting together the lateral wall and the inlet wall.

26 Claims, 10 Drawing Sheets

(56) References Cited

U.S. PATENT DOCUMENTS

| | | |
|---|---|---|
| 2011/0212225 A1 | 9/2011 | Mariller |
| 2012/0225168 A1 | 9/2012 | Kamerbeek et al. |
| 2012/0231123 A1 | 9/2012 | Kamerbeek et al. |
| 2012/0231124 A1 | 9/2012 | Kamerbeek et al. |
| 2012/0251694 A1 | 10/2012 | Kamerbeek et al. |
| 2012/0269933 A1 | 10/2012 | Rapparini |
| 2014/0196608 A1 | 7/2014 | Amrein et al. |

FOREIGN PATENT DOCUMENTS

| | | |
|---|---|---|
| EP | 1344722 A1 | 9/2003 |
| EP | 1944248 A1 | 7/2008 |
| EP | 1 440 636 B1 | 12/2009 |
| EP | 2 476 633 | 7/2012 |
| JP | 2011-45727 A | 3/2011 |
| JP | 2011-104358 A | 6/2011 |
| WO | 2004/006740 A2 | 1/2004 |
| WO | WO 2004/064584 A1 | 8/2004 |
| WO | 2007 122208 | 11/2007 |
| WO | 2009/084059 A1 | 7/2009 |
| WO | 2010 041179 | 4/2010 |
| WO | 2010 128844 | 11/2010 |
| WO | WO 2011/027259 A1 | 3/2011 |
| WO | 2011 047836 | 4/2011 |
| WO | 2012/080501 A1 | 6/2012 |

OTHER PUBLICATIONS

Notice of Opposition issued in EP Patent No. 2782849 (partial English translation submitted).

Response to Opposition in EP Patent No. 2782849, dated Aug. 9, 2017.

Office Action dated Sep. 4, 2018 in corresponding Korean Patent Application No. 10-2014-7016688 (with English Translation), 9 pages.

\* cited by examiner

CAPSULE AND SYSTEM FOR BEVERAGE PREPARATION

TECHNICAL FIELD

The present invention relates to a capsule, or cartridge, for preparing beverage, such as coffee, from a dose of one or more products contained inside the capsule, by means of a beverage production device (brewing device) and to the system formed by said capsule and said brewing device. More particularly, the invention relates to a disposable capsule that, in use, is opened for the injection of brewing liquid by piercing means of the brewing device.

BACKGROUND OF THE INVENTION

These types of capsules have been known from the 1970's. Beverage capsules comprise a container portion that houses a dose of at least one extractable product, generally ground coffee, but also tea herbal extracts and similar products. The capsules also comprise a portion that interacts with a brewing device to prepare the required beverage. The typical brewing device comprises a boiler, an enclosing member, or receptacle, intended to cooperate with the capsule and a pump or similar means so that the brewing liquid or solvent, usually but not exclusively hot water under pressure, can be fed to the capsule for the extraction of the beverage from the dose of product contained therein.

In a known beverage preparation process, a capsule is placed into the receptacle of the brewing device and is fed with the brewing solvent, such as hot water. The injected solvent passes through the capsule and thus creates by dissolving the soluble solids contained in the foodstuff or solubilising the powder contained in the capsule or otherwise diluting the liquid concentrate contained therein. In other words the injection of the solvent inside the capsule allows for the constitution of the beverage from the ingredient enclosed therein. The beverage thus formed exits the capsule to reach a beverage collector or outlet spout and then a cup or a container.

The injection of the brewing liquid may be obtained by providing a surface of the capsule where holes are present, usually these holes being placed on the water inlet surface of the capsule. This solution, though, results in coffee powder to be spilled outside the capsule during handling or transport and in general in a faster oxidization of the foodstuff. For the above reasons it is preferred to use closed or sealed capsules in which the inlet means, i.e. the at least one opening for the brewing liquid to penetrate into the capsules, is created on an inlet surface of the capsule, preferably its inlet wall when the capsule is used. For this purpose the brewing device is provided, usually at its water inlet wall, with piercing means, usually in the form of one or more protruding parts, such as needles or blades, that are moved with respect to the capsule (or viceversa) for perforating the inlet surface or inlet wall of the capsule, generally the piercing means protrude, at least in part, through the inlet surface. Openings, or holes, formed by the piercing means allow the passage of the brewing liquid inside the capsule.

Feeding of brewing hot water by piercing the inlet wall of the capsule is a method well known in the art and is disclosed in several prior art documents.

U.S. Pat. No. 2,778,739 discloses a package for beverage infusion having a body and an upper cover that is pierced by protruding elements of the brewing device. A similar concept is disclosed in U.S. Pat. Nos. 2,968,560 and 3,607,297.

Recently, some problems have been encountered by using capsule made of plastic polymers instead of capsule made of more rigid and thinner material, such as aluminium. Capsules made of plastics can be difficult to perforate so that full piercing of the capsule wall is not achieved, thereby no solvent e.g. hot water can be injected in the capsule, or only a partial perforation is achieved, thus providing an irregular and unsatisfactory distribution of the solvent inside the capsule and equally irregular quality of the beverage in the cup.

Therefore there is the need of obtaining a good perforation of capsules, especially of capsules made of materials softer than aluminium, such as standard thermoplastic materials, e.g. PE or PP polymers, or degradable plastics or so called bio-materials, e.g. PLA.

For facilitating the perforation by piercing means of the brewing device plastic capsules have been provided with reinforcing members, for example as disclosed in the international patent application WO2011/027259.

WO2011/027259 discloses a capsule having reinforcing means provided on its lateral wall in the form of a plurality of circular ribs, or an annular protruding member, and similar.

These solutions require, ceteris paribus, a higher mass of thermoplastic material during the production process, resulting in a heavier, less environmental-friendly capsule. Also, in any case, reinforcing members provided on the outer wall of the capsule may prove only partially effective for the reinforcement of the inlet wall in the areas where it has to be perforated.

EP2287090 discloses a capsule having an inlet wall provided with a section thinner than the rest of the wall, in the position where the piercing elements of the brewing apparatus will impinge, so as to facilitate the penetration of blades of the water injection device. Such thinning of the walls allows, though, for the deformation of the walls. For this reason reinforcement ribs are provided, too, extending both on the inlet wall and on the side wall of the capsule, thus avoiding undesired deformation of the capsule when piercing means of the brewing device exert a perforation force on the inlet wall of the capsule. However, reinforcing members that are disposed on the inlet wall of the capsule need to be dimensioned, positioned and oriented in an accurate manner so as to not be impinged by the piercing means of the capsule. In fact, should these ribs be contacted by the piercing blades of the brewing device, they would prove very hard if not impossible to perforate due to the additional material that determines an increase of the thickness of the inlet wall of the capsule in correspondence of the ribs.

WO2010/041179 shows a sealed capsule having an inlet wall and a lateral wall (see FIG. 2) wherein a sunken portion is provided on the inlet wall; the sunken portion extends on the inlet wall only and ends at the beginning of the lateral wall (see FIGS. 5 and 6). This sunken portion of the wall is intended to be a reinforcing element that cooperates with a corresponding radial ridge on inlet wall. The reinforcing effect of the sunken portion is almost inexistent.

WO2012/080501, that was filed before and published after the priority date of the present application, discloses a capsule where the inlet wall, or base—to use the terminology adopted in the document—is provided with a reinforcement zone arranged circumferentially on the base as a plurality of recesses; all the recesses are located and contained within the base. The recesses have two walls forming an angle of about 90 degrees with each other, wherein one of the walls is vertical, i.e. is parallel to the rotational vertical axis of the capsule and the other is substantially horizontal. However, the reinforcing effect of this structure is very limited, actually non existent if the capsule is thermoformed, so that the amount of deformed and not-opened capsules is very high and the opening of the capsule is not carried out in a reliable way.

It is an aim of the present invention to solve the above problems and to provide a capsule that can be pierced in a simple and effective manner, and to limit the number of reinforcing members on the upper inlet wall of the capsule.

Another aim of the present invention is to provide adequate reinforcement to the area where the inlet means need to penetrate the capsule wall, yet minimising the increase of capsule material needed to achieve such objective.

Another aim of the present invention is to provide a capsule that can be produced in a simple manner without the need of providing a portion of reduced thickness on the inlet wall of the capsule depending on the position of the piercing means of the brewing device.

SUMMARY OF THE INVENTION

These and other aims are achieved by means of the capsule of the present invention, that is a capsule for the preparation of a beverage from a dose of a product. A further object of the invention is a system for beverage preparation.

The present capsule may be manufactured in plastics, bio-plastics, so-called "green"-plastics (that is plastics derived from renewable sources).

The capsule can be produced by injection molding or by thermoforming. The capsule may be provided with a layer that acts as a barrier to oxygen and gas permeation.

A suitable known barrier material is e.g. EVOH, that can be e.g. present as a multilayer structure with polypropylene such as PP-EVOH-PP or with polystyrol and polyethylene, such as PS-EVOH-PE; these materials are cheaper and better recyclable than aluminium. The multilayer structure may be a laminate to be used in thermoforming; alternatively, the multilayer structure is obtained by co-injection moulding of the capsule body; co-injection of coffee capsules is a technique commonly known to the skilled person and is not an object of the present invention.

Such technique is commercially available.

The barrier may be also provide externally as a coating. Suitable coatings are those available from e.g. Nanolok™ PT ADV-7 and the PVD or PECVD coatings. Coatings can be applied by spraying or by dipping, suitable coatings, especially nanocoatings, can be obtained from a composition including kaolin clay or silicate nanoparticles and polymers, optionally as an aqueous composition. Such compositions are e.g. concentrated nanocomposite dispersion which includes a silicate filler and a matrix polymer dispersed in an aqueous medium such as those disclosed e.g. in WO2009/114071, WO2006/115729, WO2008/147380, WO2009/114072, U.S. Pat. No. 8,309,230.

A further type of barrier can be obtained by adding suitable nanocomposite to the plastic material as disclosed e.g. in WO2007/106671.

The capsule comprises a lateral wall, an inlet wall and a lower wall forming a hollow body where foodstuff is contained and having a substantially central axis, the inlet wall extending from a peripheral end of the lateral wall towards said central axis. The capsule is characterized in comprising at least one sunken portion extending on and connecting together said lateral wall and said inlet wall. More in detail, the sunken portion is provided in correspondence of the peripheral end of the lateral wall from which the inlet wall extends, i.e across the edge between lateral and inlet wall; thus the sunken portion extends on both the lateral wall and the inlet wall of the capsule. This means that in at least one position, preferably in a plurality of positions, a portion of the lateral wall and a portion of the inlet wall are missing and that in those positions the walls are replaced by at least one connecting wall that is defining a "sunken portion" of the body of the capsule; the wording "sunken" is used with reference to the level of the walls in the rest of the body of the capsule. In the drawings, the lateral wall extends from the flange to edge line 2c; the lateral wall can have portions with different conicity or different angles with respect to the vertical axis of the capsule, as is shown in FIGS. 1-9, e.g. with references 2b and 2a. Each sunken portion comprises a surface, preferably "oblique", forming an additional wall that is angled with respect to both lateral and inlet walls and that is connecting said walls; as is shown in the drawings, this connecting surface is preferably flat and connects one area of the lateral wall that is spaced from the edge or border between lateral and inlet walls with an area of the inlet wall that is spaced from the edge between lateral and inlet walls. Preferably, on the inlet wall, the sunken portions, or recesses, end at a distance from the central axis, so as to leave an area of the inlet wall where the perforation by the brewing device blades can be carried out. On the inlet wall, the sunken portions may continue down to the flange, however, because there is a protrusion for each sunken portion, or recess, in the interior of the capsule body, the greater is the volume of the sunken portions, the smaller will be the volume of the capsule body available for storing coffee or other product; preferably, the sunken portions on the lateral wall do not extend lower than the half length of the wall, more preferably the sunken portions lower end is located within the upper third of the length of the lateral wall and even more preferably within the upper 25% of said length.

As also mentioned below and as shown in the drawings, the angle β between inlet wall and lateral wall is 90° or more, preferably more than 90°, to provide further rigidity to the structure; a preferred range for angle β is 100° to 130°.

In other words, the sunken portions of the capsule form a modification of both the lateral wall and the inlet wall of the capsule providing a correspondent protrusion inside the capsule.

It has to be understood that sunken portions comprise at least one surface connecting the lateral wall to the inlet wall of the capsule so as to provide a kind of "corrugation" with continuity in the surface of the capsule. According to different possible embodiments, the sunken portion can be formed by one continuous surface or by two or more surfaces, that can be oriented symmetrically or asymmetrically towards one to another in different manner to obtain the desired form of the sunken portion.

In designing, the sunken portion can be seen as the "removal" of a portion of volume of the capsule from the junction, i.e. the edge, between inlet and lateral walls; thus, the walls are modified and they "sink" below their original level to rise again to the original level and shape. Exemplary shapes of the removed volume are prisms or portions of prisms, preferably a prism selected from triangular, parallelepiped, cylinder and hexagonal base prisms, or other prisms having a base formed by a regular or irregular polygon.

Advantageously the presence of one or more sunken portions in correspondence of the peripheral end of the lateral and the inlet walls, i.e. the connection line between the lateral wall and the inlet wall, allow to obtain a stiffening of this area, and in general of both the inlet surface (inlet wall) and lateral surfaces of the capsule, thus avoiding undesired deformation when, in use, a perforation force is exerted on the inlet wall of the capsule by piercing means of the brewing device.

On the contrary, the known capsules, for example of the type described in the above mentioned patent application WO2012/080501, provided with a plurality of recess extending only on the inlet (base) wall of the capsule, inevitably lead to undesired deformation of the upper portion of the lateral wall of the capsule below the peripheral edge from which the inlet wall extends, when the capsule is contacted by piercing means of the brewing device. The capsule according to the invention, provides a reliable and effective reinforcement of both the inlet wall and the lateral wall, in correspondence of the peripheral end of the lateral and the inlet walls, i.e. the connection line between the lateral wall and the inlet wall. This result is achieved by providing one or more sunken portion in correspondence of the peripheral end of the lateral and the inlet walls, i.e. the connection line between the lateral wall and the inlet wall, and in particular by means of the at least one surface of the sunken portion connecting the lateral wall to the inlet wall of the capsule.

According to an aspect of the present invention, said one or more sunken portions are radially arranged with respect to the central axis of the capsule, and preferably the capsule comprises a plurality of sunken portions arranged with constant spacing along the said peripheral end of the lateral wall, thus providing a uniform stiffening of both the lateral wall and the inlet wall of the capsule. According to different possible embodiments, the zones of the capsule that are not provided with sunken portions and wherein the lateral wall is connected to the inlet wall in correspondence of the peripheral edge (2c see below) of the lateral wall represent 30-80%, preferably 40%-80%, most preferably 40%-60% of the total circumferential length of said peripheral edge. In other words, a length of the circumferential peripheral edge (2c) of the lateral wall that is 30% to 80%, preferably 40%-80%, most preferably 40%-60% of the total circumferential length can be provided without sunken portions.

Providing a sunken portion, or recess, across the edge, or junction, between inlet and lateral wall results, as mentioned, in a greater rigidity than in known capsules. This effect is further enhanced in the preferred embodiment of the invention, where the sunken portion, or recess, has a bottom surface that directly connects the lateral and the inlet walls; the wording "directly connects" is intended to mean that said surface lies on a plane P that extends from lateral wall to inlet wall or contains an axis B that extends from lateral wall to inlet wall. In other words, the preferred surface does not change its inclination with reference to the central axis of the capsule when measured along a straight line directed towards the said central axis of the capsule. The surface is angled with respect to the vertical axis of the capsule forming an acute angle $\alpha$ (visible in FIGS. 2, 4 and 8) with the vertical, i.e. with respect to a direction parallel to the central axis A of the capsule, or (which is the same) with the central axis of the capsule. Preferably angle $\alpha$, as defined above, is comprised in the range 10°-65°, preferably 30°-50°, most preferably about 40°-50°. The present description is intended to cover all the combinations of the above angles $\alpha$ with the ranges of above mentioned angle $\beta$.

In a preferred exemplary embodiment, the number of sunken portions, or recesses, is selected from prime numbers, preferably their number is selected from 5, 7, 11 or 13. This was found to be advantageous especially in a system where the number of blades or perforating elements in the brewing device is 3 or otherwise an odd number.

Advantageously, according to a preferred embodiment, the thickness of the sunken portion is equal to the thickness of the inlet wall and/or of that of the lateral wall outside said sunken portion. It has to be noted that in the present disclosure the expression "thickness of the sunken portion" is intended as the thickness of the capsule surface in correspondence of the sunken portion, and in particular as the thickness of the at least one surface of the sunken portion that connects the inlet wall and the lateral wall of the capsule providing continuity in the capsule surface in correspondence of the sunken portion.

In a preferred embodiment, the thickness of the inlet wall, of the sunken portions and of the upper (inlet) wall is the same.

As known and above mentioned, in a preferred exemplary embodiment of the invention, at least part of the inlet wall of the capsule comprises a piercing area provided between the sunken portions and the vertex of inlet wall, i.e. the area of the inlet wall in correspondence of the central axis of the capsule.

According to an exemplary embodiment, the piercing area or areas are provided with a reduced thickness with respect to the thickness of inlet wall outside said perforation area. The perforation area and the sunken portions cooperate in order to allow the effective perforation of the inlet wall of the capsule.

The present invention also relates to a system comprising the capsule and a brewing device provided with means for piercing the capsule, preferably in correspondence of its inlet wall. The brewing device also feeds a brewing liquid, preferably hot water under pressure, inside the capsule. The brewing device is, generally, further provided with an enclosing element, or receptacle intended to house at least part of the capsule during the beverage preparation process.

In use, the at least one piercing area is contacted and perforated by said piercing means of said brewing device. According to a possible embodiment the at least one piercing area is arranged along a path corresponding to the path along which are arranged said piercing means of the brewing device. The invention provides several advantages with respect to the prior art. The piercing area of the inlet wall is thin and rigid enough to be pierced in an easy and reliable way, so that water is easily fed into the capsule and the content of the capsule is efficiently extracted to provide a beverage. In fact, the use of at least one (preferably a plurality of) sunken portion, or recess, that extends on an area of the inlet wall and on an area of the lateral wall, in correspondence of the edge between lateral and inlet walls, i.e. in correspondence of an area extending across the "border" between said walls, provides a dramatic increase in rigidity with respect to the embodiments of the prior art.

Contrary to known capsules provided with ribs extending along the upper inlet wall and that could be difficult to pierce due to such addition of material if the ribs are impinged by piercing means of the brewing device, the sunken portions of the capsule according to the present invention are not configured so as to provide a thickness increase of the inlet wall and also of the lateral wall of the capsule. Moreover, sunken portions according to the invention provide a stiffening of the capsule without use of reinforcing members formed as an addition of material on the inlet wall and/or on the lateral wall, thus improving the environmental friendliness of such capsule, compared to existing reinforcing means.

BRIEF DESCRIPTION OF THE DRAWINGS

Further advantages and features of the present invention will be more apparent from the description below, provided with reference to the accompanying drawings, purely by way of a non-limiting example, wherein.

DETAILED DESCRIPTION

FIGS. 1-10 show the capsule 1 according to exemplary embodiments of the present invention, for the preparation of a beverage, such as coffee, tea, hot and cold drinks, or any other liquid foodstuff, from a pre-determined amount of an extractable or soluble or dilutable product, either liquid or solid, contained inside the capsule. Preferably the dose of product comprise a powder product, such as coffee powder, which is brewed by means of brewing liquid, preferably hot water under pressure, that is injected into the capsule for obtaining the desired beverage.

The capsule according to the invention is used into a beverage preparation device (i.e. a brewing device) provided with an enclosing element, or receptacle (not shown in the figures) intended to house at least part of the capsule during the beverage preparation process. The brewing device is further provided with blades or other means for piercing the capsule, preferably in correspondence of the inlet wall of the capsule (inlet wall) in order to feed the brewing liquid, preferably hot water under pressure, inside the capsule. The capsule 1 used in combination with the brewing device forms a system for the beverage preparation according to the invention.

In use, the enclosing element of the brewing device is moved with respect to the capsule 1, or vice versa, so that a seal-tight engagement with the capsule 1 can be obtained and the piercing means can be brought in contact with the capsule for its perforation, in particular with a piercing area 30 of the inlet wall 3 of the capsule. The brewing device and the way it is operated are known per se in the art and is not an object of the present invention.

The capsule 1 according to the invention comprises a lateral wall 2 that includes portions 2*a*, 2*b*, 2*d* and end portion, or edge portion, 2*c*, an inlet wall 3 and a lower wall 4, said walls defining a hollow body 5 where the dose of product is located. The inlet wall 3 is the inlet surface of the capsule and is intended to be perforated by the piercing means of the brewing device (not shown) to obtain inlet openings allowing the passage of the brewing liquid into the capsule. The lower wall 4 allows the exit of the brewed beverage from the capsule into a container and, as will be disclosed in greater detail later, the outlet means of the capsule, i.e. the elements allowing the exit of the brewed beverage, can be made in different ways.

The capsule 1 has a substantially cup-shape, or frusto-conical shape, with a central axis A (vertical axis), in other words, in the exemplary embodiment shown in the figures, the lateral wall 2 is not parallel to the central axis A and the hollow body 5 is closed by the lower wall 4 at one end and by the inlet wall 3 at the opposite end of the lateral wall with respect to the lower wall 4.

Moreover, as shown in the figures, the lateral wall 2 can be provided with different thickness along its extension between the inlet wall 3 and the lower wall 4. In the embodiment shown in the figures, lateral wall 2 is divided by lines 7 into a lower portion 2*a* and an upper portion 2*b*; the lower portion 2*a* of the lateral wall 2 is provided with a greater thickness with respect to the thickness of the upper portion 2*b* of the lateral wall 2. As visible in the shown exemplary embodiment, the thickness of the inlet wall is the same as that of the upper portion 2*b* of the lateral wall.

According to possible embodiments, the thickness of the lateral wall 2 and of the inlet wall 3 is comprised in the range 1.5 mm-0.15 mm, and preferably in the range 1 mm-0.2 mm. In the embodiment shown in the FIGS. 1-6, the thickness t1 (see FIGS. 2 and 5) of the inlet wall 3 and of the upper portion 2*b* of the lateral wall 2 is 0.25 mm. The thickness t2 of the lower portion 2*a* of the lateral wall 2 is 0.5 mm. FIG. 5 shows a preferred embodiment of the capsule, equal to that disclosed in FIG. 1-4 except for the lower portion 2*a* of the lateral wall 2 that is provided with a constant thickness t2. Also in this embodiment the lower portion 2*a* of the lateral wall 2 is provided with a greater thickness with respect to the thickness of the upper portion 2*b* of the lateral wall 2. As visible from the figures, portions 2*a* and 2*b* of the lateral wall may have different inclination with respect to the vertical (i.e. longitudinal) axis A of the capsule; similarly, the inlet wall 3 has two areas with different inclination with respect to axis A of the capsule.

Figure 7:
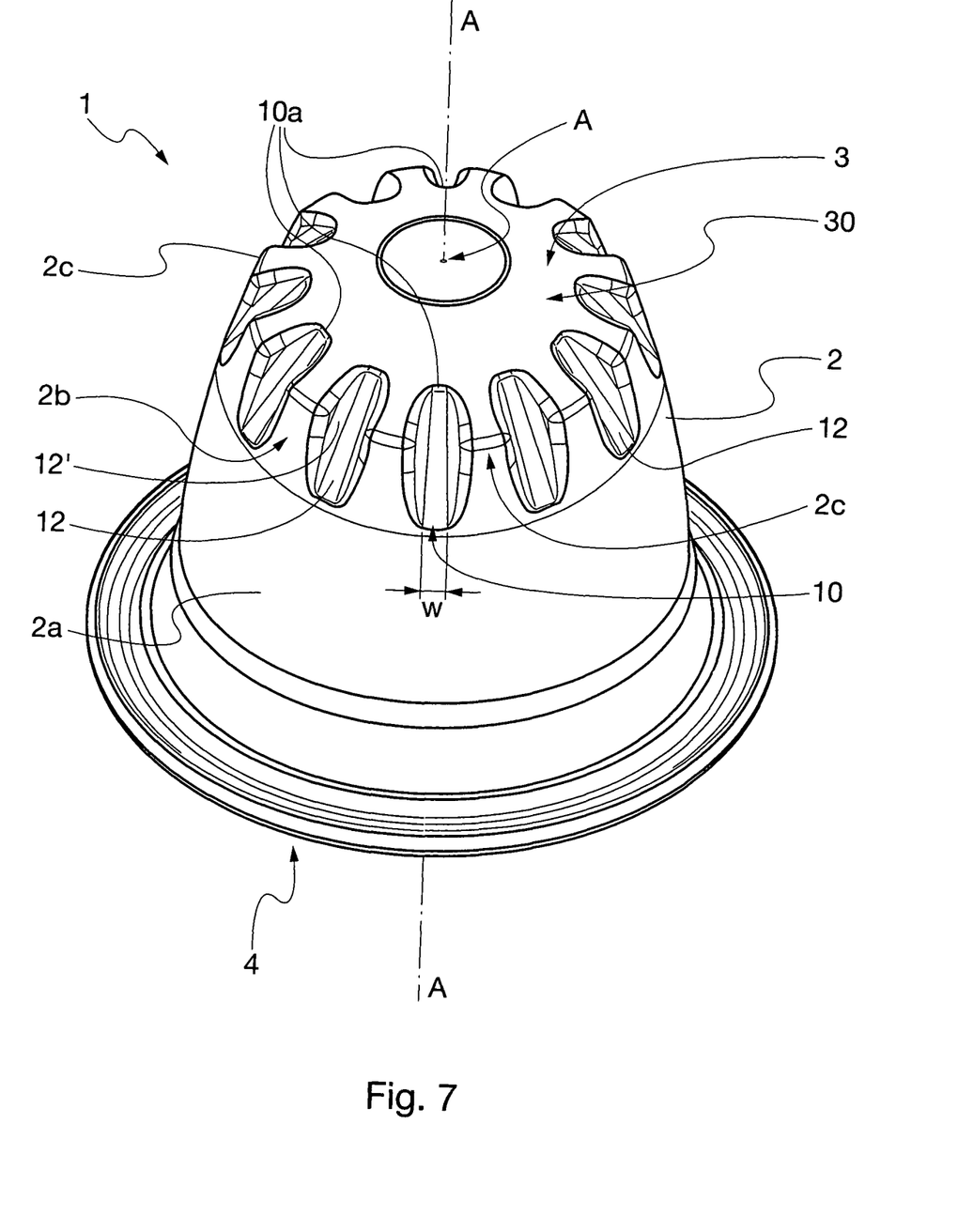
FIG. 7 is a perspective view of another possible embodiment of the capsule according to the present invention.
Figure 8:
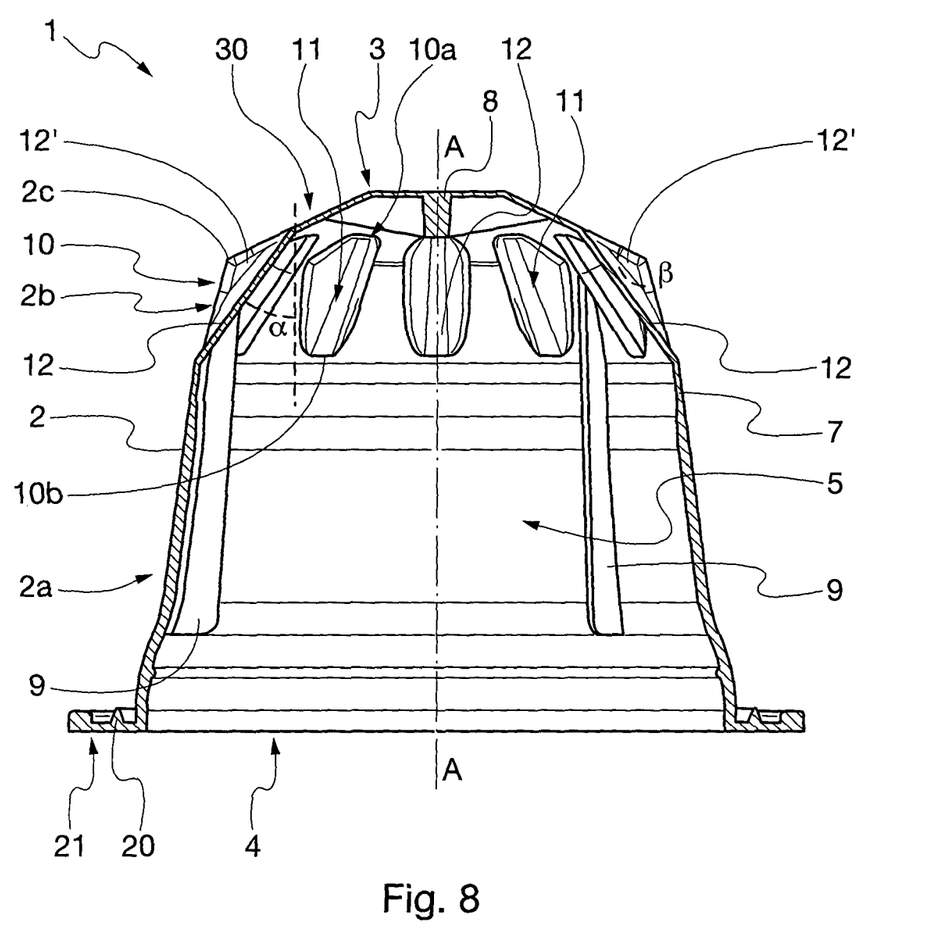
FIG. 8 is a radial sectional view from a plane passing through the central axis of the capsule and cutting two sunken portions of the capsule according to FIG. 7.
Figure 9:
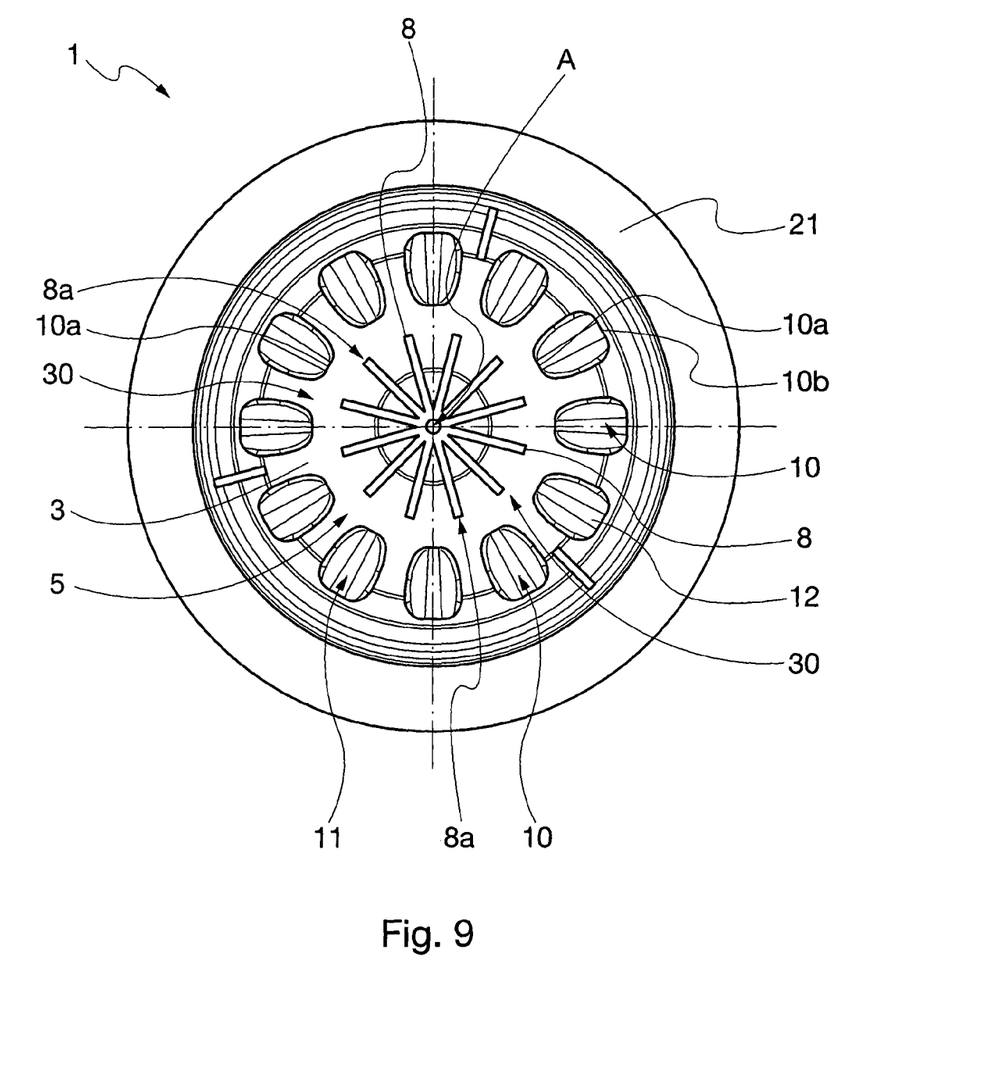
FIG. 9 shows from below the inside portion of capsule hollow body according to FIGS. 7 and 8.
Figure 10:
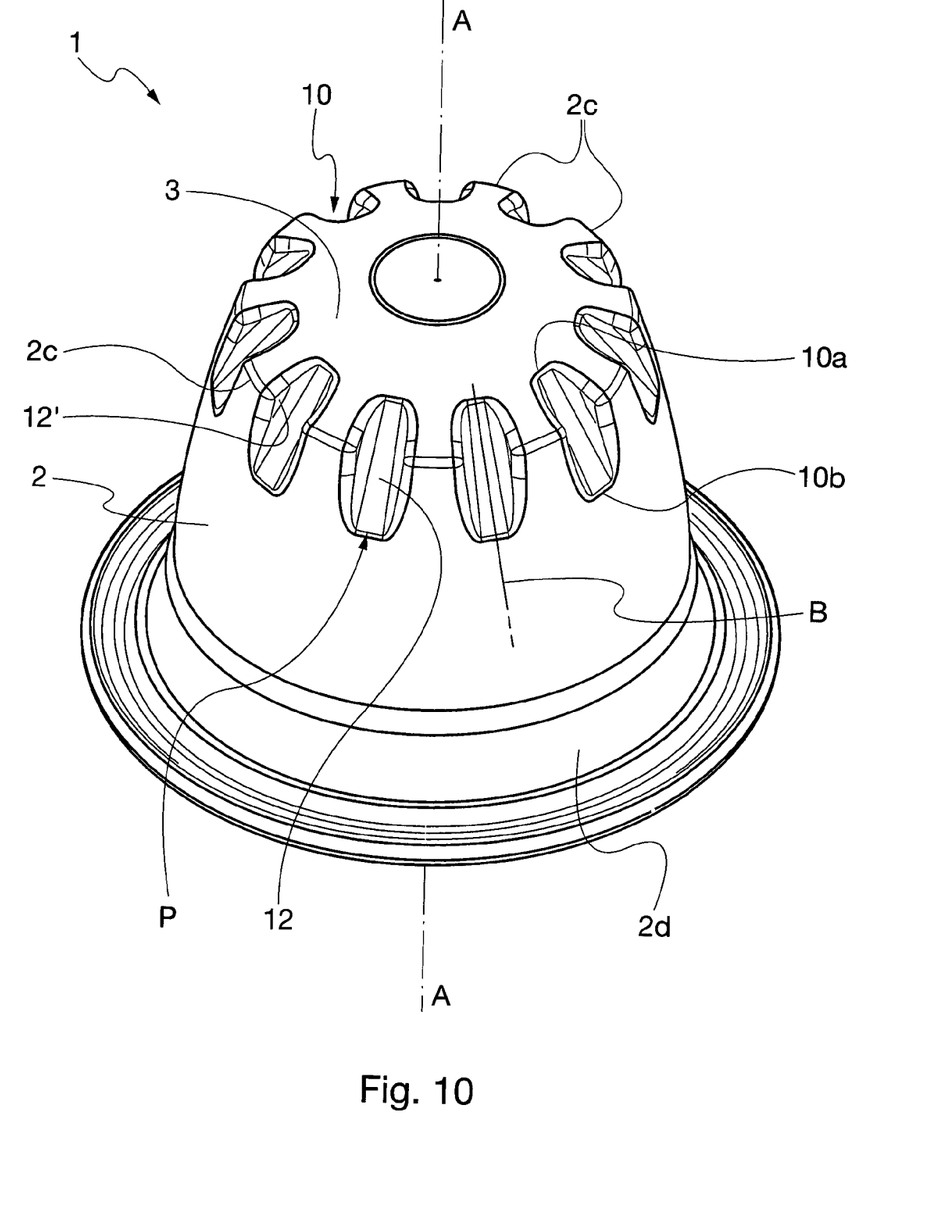
FIG. 10 is a sectional view of another capsule according to the invention.

FIGS. 7-9 show an further embodiment of the capsule 1 wherein the lower portion 2*a* of the lateral wall 2 is provided with a constant thickness. Also in this embodiment the lower portion 2*a* of the lateral wall 2 is provided with a greater thickness with respect to the thickness of the upper portion 2*b* of the lateral wall 2. In FIG. 10, the inclination with respect to the longitudinal axis A of the lateral wall portions 2*a* and 2*b* is the same.

In the embodiment shown in the FIGS. 1-10, inlet wall 3 of the capsule extends from the peripheral end 2*c* of the lateral wall 2, towards central axis A of the capsule so that the capsule upper portion is closed by the inlet wall 3.

It has to be noted that the inlet wall 3 can be at least partially flat and/or convex and/or tapered, in other words, the inlet wall 3 can be shaped in different manner in order to facilitate both the insertion of the capsule into the receptacle of the brewing device and also the perforation of the inlet wall 3 by piercing means of the brewing device.

Also the inclination of the inlet wall 3 at the peripheral edge 2*c* of the lateral wall 2 can be varied according to different possible embodiments, and preferably the angle β (see FIGS. 2, 4 and 8) formed (inside the capsule) between the inlet wall 3 and the lateral wall 2 at the peripheral end 2c is equal or greater than 90°. In the embodiment shown in the figures, the capsule is provided with a substantially convex inlet wall 3, and the angle β formed between the lateral wall 2 and the inlet wall 3 is greater than 90°, preferably more than 90°, to provide further rigidity to the structure; a preferred range for angle β is 100° to 130°.

As known by the skilled in the art, these different shapes determine different volumes of ingredient inside the capsule's body and thus may be chosen depending on the desired ingredient volume required without affecting the underlying strengthening effect generated by the principles embedded in the invention of the present Application.

As mentioned, the thickness of the inlet wall, 3, is such as to allow an easy perforation by the device piercing members (e.g. blades, not shown); additionally, in the shown preferred embodiment the same—reduced—thickness extends along the lateral wall until junction lines 7, where the lateral wall increases to provide greater rigidity to its lower portion.

According to the invention, the inlet wall 3 of the capsule comprises at least one piercing area 30, which will be disclosed later in greater details. In the shown (preferred) embodiments piercing area 30 is provided between said central axis (A) of the capsule and at least one sunken portion 10 on the inlet wall 3.

Said piercing area or areas 30 is pierced by piercing means of the brewing device extending along a predetermined path for perforating said capsule to provide a path for a brewing liquid into the said capsule. According to an aspect of the present invention, the piercing area or areas 30 of the capsule provided on the inlet wall 3 extends at least in part along a path corresponding to the path along which the piercing means of the brewing device are arranged.

In use, the piercing area or areas 30 of the inlet wall 3 is contacted and perforated by piercing means of the brewing device in order to feed the brewing liquid into the capsule. To impart the required rigidity to the upper portion of the capsule and ensure the rigidity required for a reliable and sure piercing, the capsule according to the present invention is further provided with at least one, preferably a plurality of sunken portions 10 extending on both the inlet wall 3 and on the lateral wall 2 and connecting together areas of said walls; in other words, the capsule is provided with at least one sunken portion 10 forming a corrugation in correspondence of the peripheral end 2c of the lateral wall 2. It has to be noted that the at least one sunken portion 10 defines a modification of the shape of both the inlet wall 3 and of the lateral wall 2 in correspondence of the peripheral edge 2c of the lateral wall 2 from which the inlet wall 3 extends.

More in detail, the sunken portion 10 is provided in correspondence of the peripheral end 2c of the lateral wall 2 from which the inlet wall 3 extends, thus the sunken portion extends on both the lateral wall and the inlet wall of the capsule. Sunken portion 10 comprises at least one surface connecting the lateral wall to the inlet wall of the capsule forms in fact an additional wall that connects lateral and inlet walls 2, 3, and is angled with respect to both of them.

In the shown embodiment the thickness of inlet wall 3, lateral wall's upper portion 2b and sunken portions 10 is constant; however the invention includes embodiments with different thickness in different areas of the walls. As shown in the sectional view of FIGS. 2, 3 and 8, to each sunken portion 10 corresponds a protrusion 11 inside the hollow body 5 of the capsule, i.e. sunken portions 10 of the capsule form a modification of both lateral and inlet wall of the capsule providing a correspondent protrusion inside the capsule.

As already mentioned above, the sunken portion 10 can be seen as the "removal" of a portion of volume of the capsule from the junction (peripheral edge 2c) between inlet 3 and lateral 2 walls; thus, the walls are modified and they "sink" below their original level to rise again to the original level and shape. Exemplary shapes of the removed volume are prisms or portions of prisms, preferably a prism selected from triangular, parallelepiped, cylinder and hexagonal base prisms or prisms having a base formed by a regular or irregular polygon. So that the at least one surface 12 of the sunken portion 10 "belongs" to at least a portion of a prism used, in designing, to "remove" a volume of the capsule.

The sunken portion 10 thus comprises a surface 12 connecting the inlet wall 3 to the lateral wall 2 of the capsule. Surface 12 is thus forming an additional wall portion of the capsule. In other words, in correspondence of sunken portion 10, inlet wall 3 is connected to the lateral wall 2 by means of at least one surface 12 of the sunken portion 10.

According to different possible embodiments, each sunken portion 10 is formed by one continuous surface or two or more surfaces that can be oriented in different manner so as to form the sunken portion 10. It has to be understood that if the sunken portion 10 is obtained by a "removal" of volume from a cylinder the sunken portion 10 comprises only one continuous surface 12 connecting the inlet and the lateral wall (see the embodiment shown in FIG. 6). In the case the sunken portion is obtained by a removal of volume from a prism with different shape such as parallelepiped or hexagonal prism, the sunken portion is formed with two or more surfaces 12 (see the embodiment shown in FIG. 6a).

Figure 1:
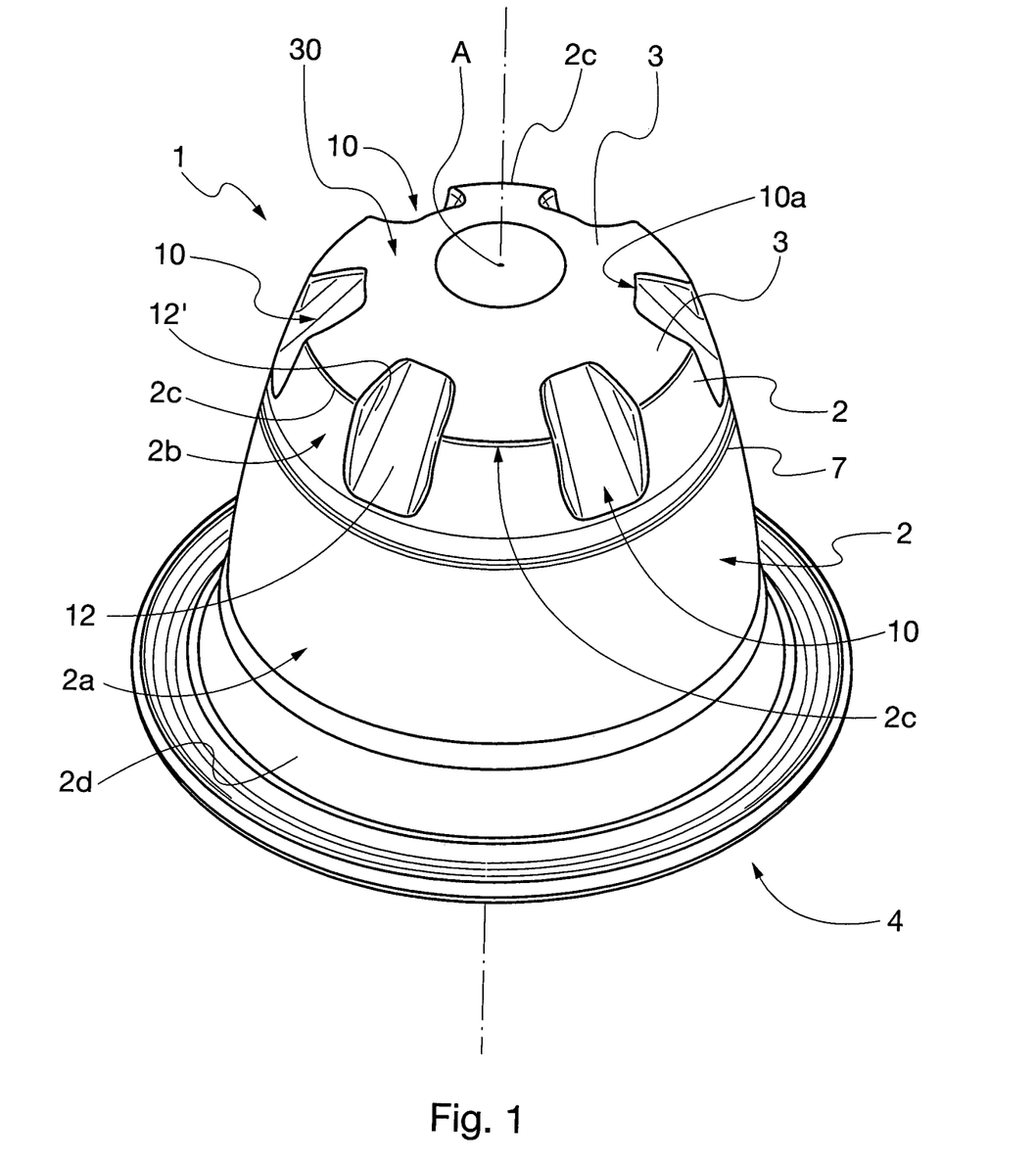
FIG. 1 is perspective view of the capsule according to the present invention.
Figure 2:
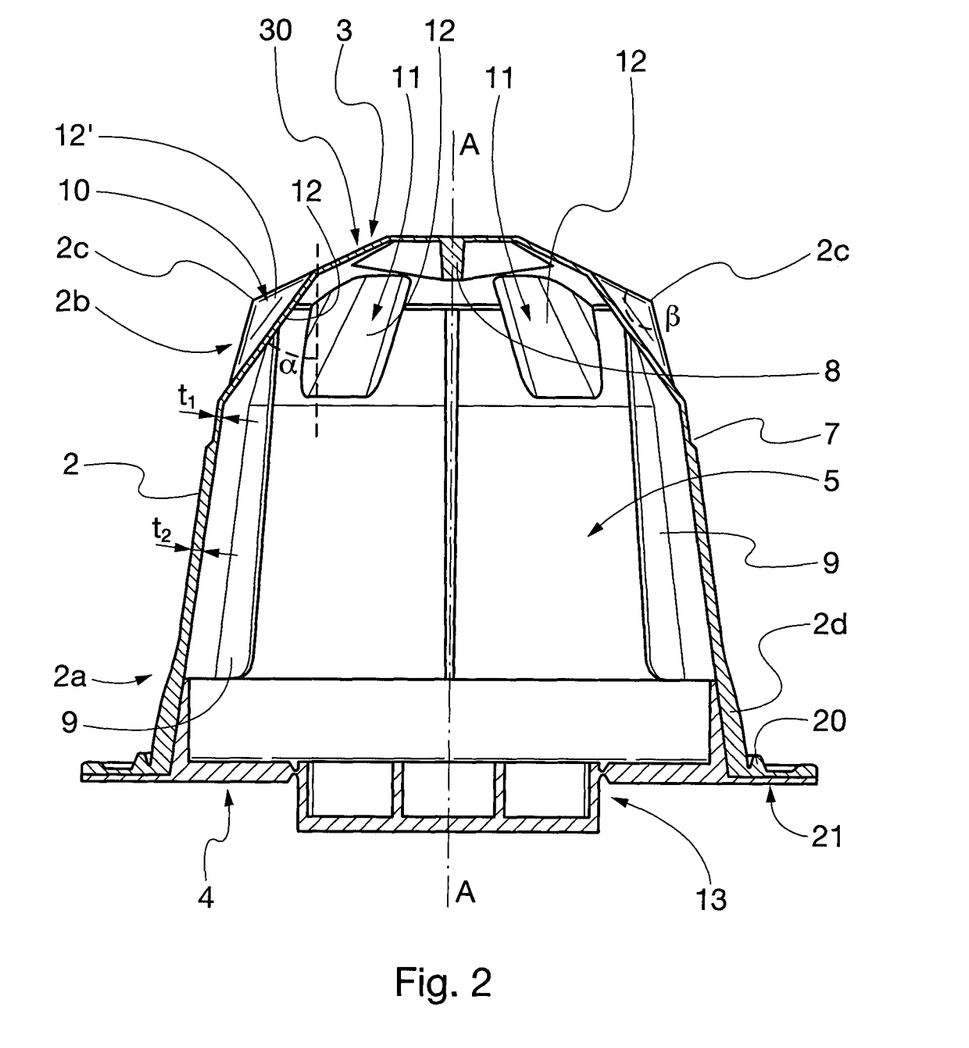
FIG. 2 is a radial sectional view from a plane passing through the central axis of the capsule and cutting two sunken portions of the capsule according to the present invention.
Figure 3:
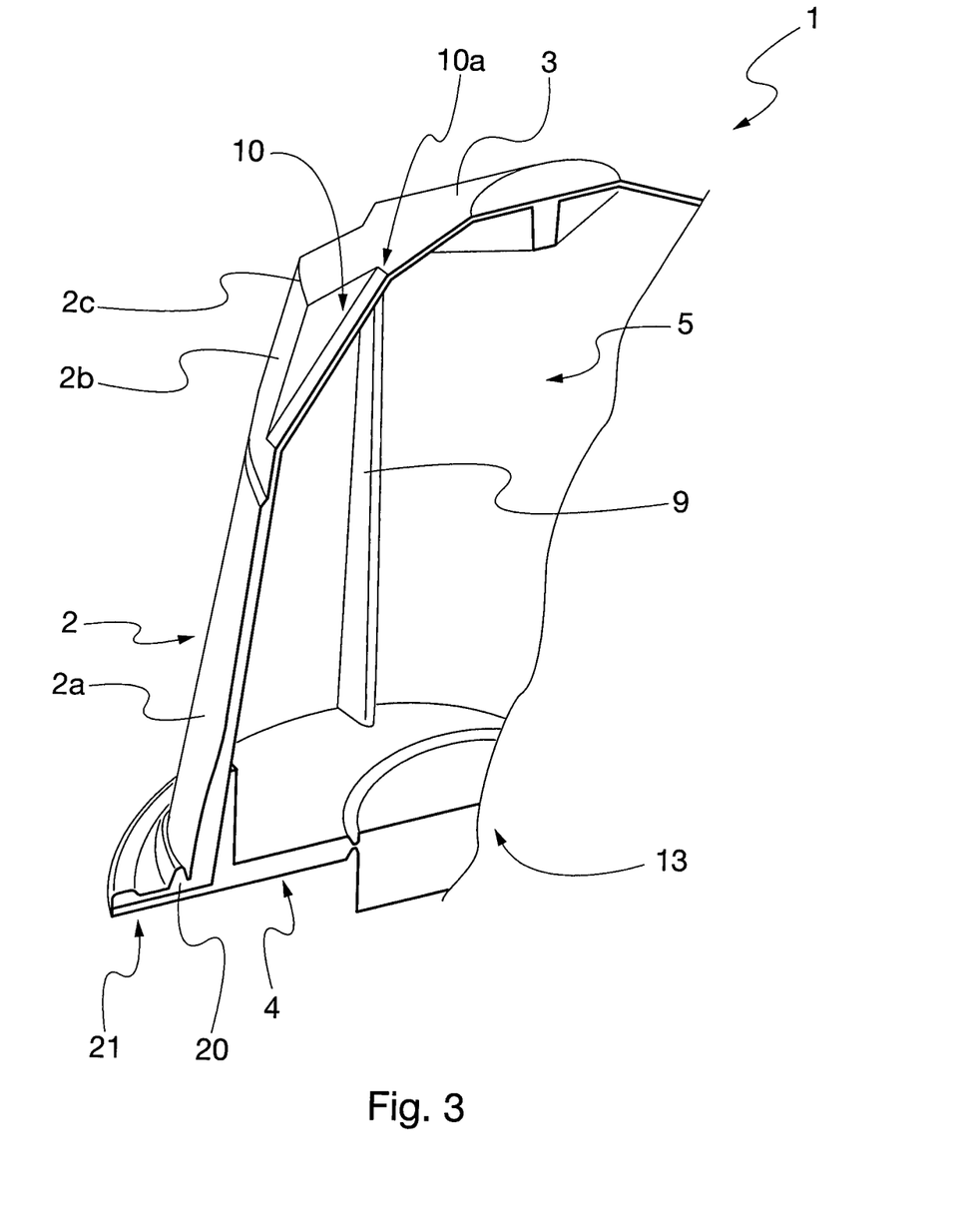
FIG. 3 is a perspective view of the sectioned capsule shown in FIG. 2.
Figure 4:
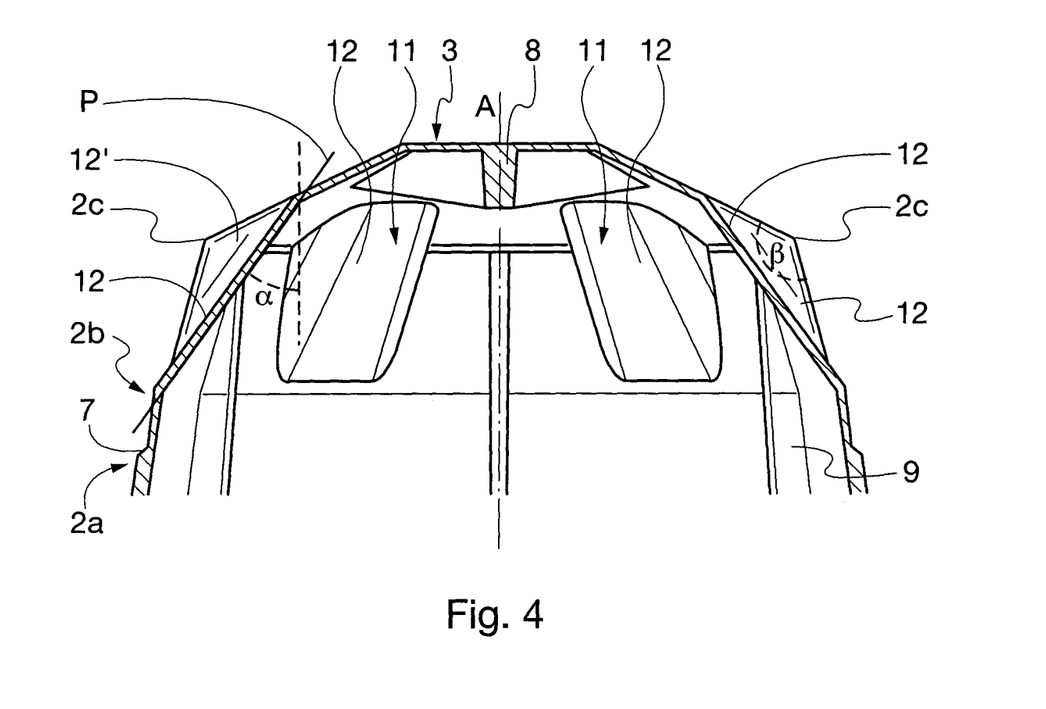
FIG. 4 is an enlarged sectional view of the area between lateral and inlet portions.
Figure 5:
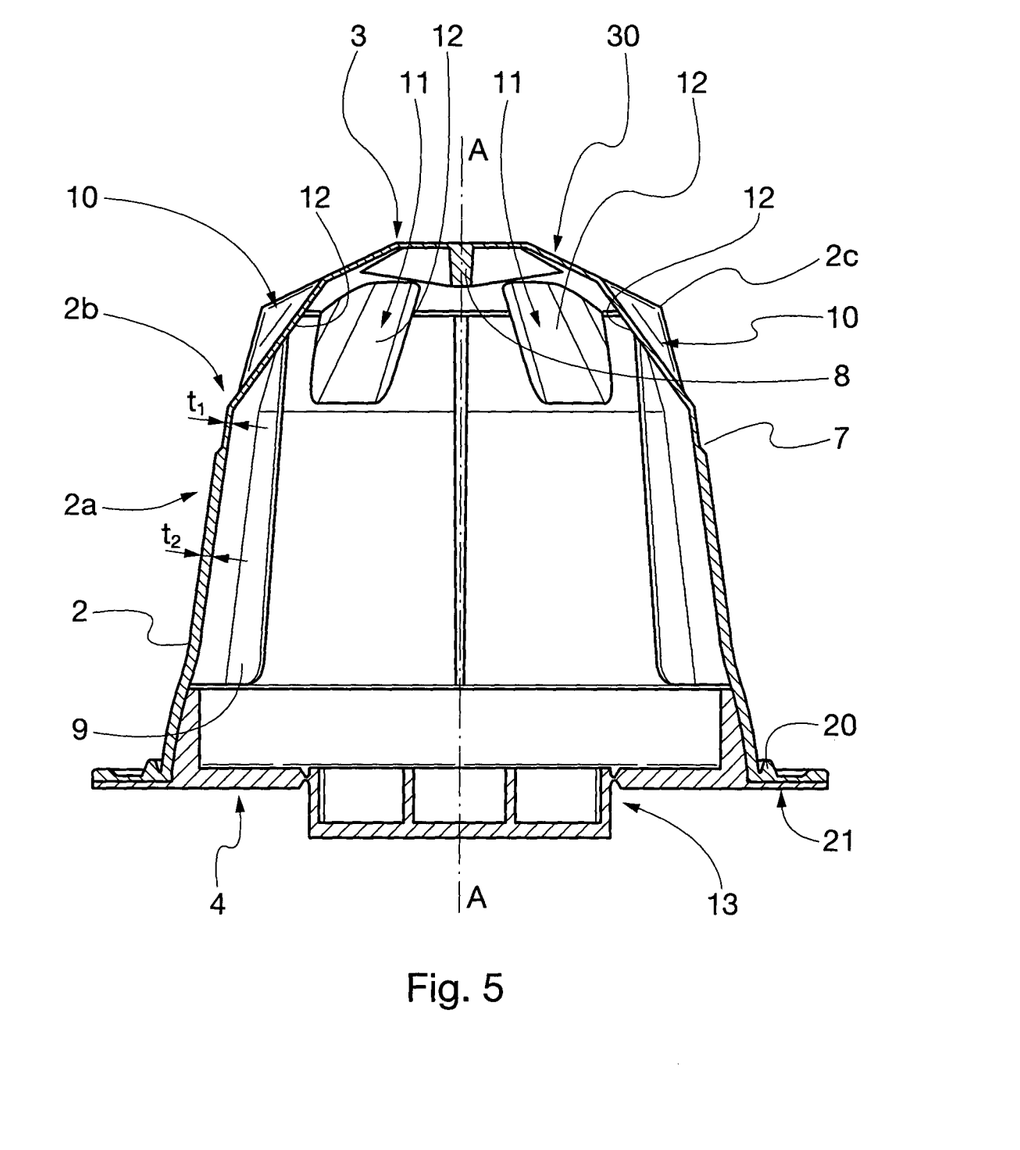
FIG. 5 shows in a radial sectional view a different embodiment of the capsule according to the present invention.
Figure 6:
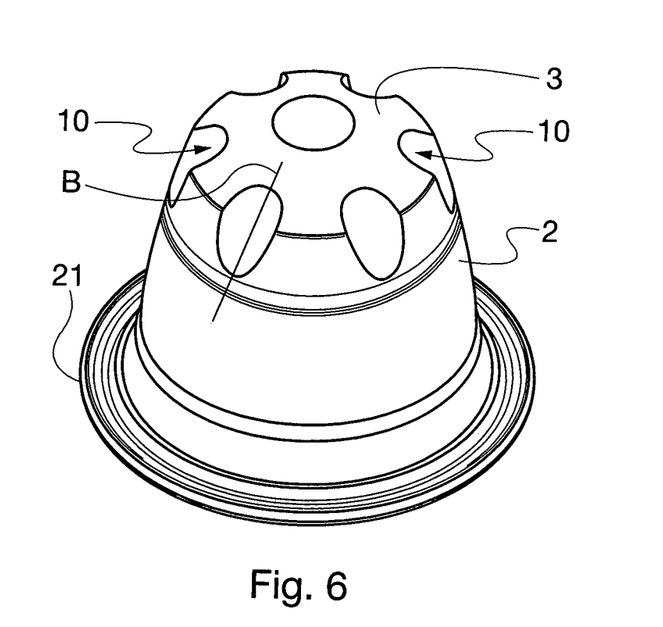
FIGS. 6 and 6*a* show two possible embodiments of the capsule according to the present invention.
Figure 6A:
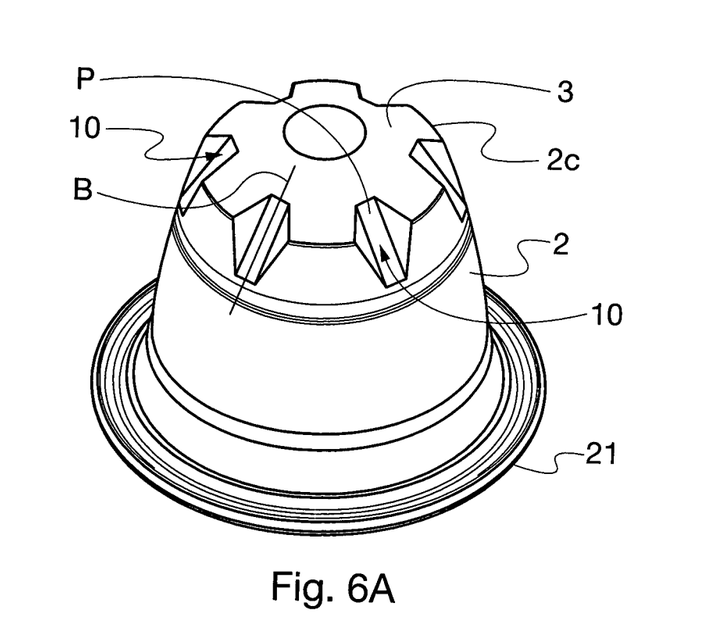

In the embodiment shown in the FIGS. 1-10, the sunken portion 10 comprises at least one inclined surface 12 with respect to the vertical, that connects the inlet wall 3 with the lateral wall. Preferably, the inclined surface 12 forms an acute angle α (visible in FIGS. 2, 4 and 8) with the vertical, i.e. with respect to a direction parallel to the central, vertical rotational axis, i.e. the longitudinal axis A of the capsule, or, more simply, with axis A, as shown in FIGS. 2, 4 and 8.

Preferably the acute angle α, as defined above, is comprised in the range 10°-65°, preferably 30°-50°, most preferably about 40°-50°.

More in detail, in the embodiment shown in attached FIGS. 1-10, each sunken portion 10 is formed by an inclined surface 12 that is provided with two lateral surfaces 12'. The inclined surface 12, is substantially flat and is inclined with respect to the vertical, and the angle α formed between the inclined surface 12 and the vertical, i.e. a direction parallel to the central axis A, is an acute angle.

The lateral surfaces 12' of the sunken portion 10 are preferably arranged on a plane passing through the central axis A of the capsule.

According to an aspect of the present invention, the sunken portions 10 are radially arranged with respect to the central axis A of the capsule, and preferably the capsule comprises a plurality of sunken portions 10 arranged with constant spacing along the peripheral end 2c of the lateral wall 2, thus providing an uniform stiffening of both the lateral wall and the inlet wall of the capsule.

Preferably the sunken portions 10 are dimensioned so as to provide a constant "full-empty" alternation along the peripheral end 2c of the lateral wall from which the inlet wall 3 extends, i.e. a constant alternation of sunken portion 10 (empty) and portion of the lateral wall 2 and the inlet wall where no sunken portion are present (full).

According to different possible embodiments of the capsule, the number and the dimensions of the sunken portions 10 can be different, without affecting the effect of strengthening the capsule to improve its piercing. In the embodiment of the capsule shown in FIGS. 7-10 the number of sunken portions 10 is increased with respect to the embodiments shown in FIGS. 1-6. Moreover, in the embodiments shown in FIGS. 7-10 the sunken portions are narrower than the sunken portions 10 of the embodiment shown in FIGS. 1-6. More in detail, in FIGS. 7-10 the width w (see FIG. 7) of the inclined surface 12 of the sunken portions 10 is reduced with respect to the embodiments shown in FIGS. 1-6.

FIGS. 1-9 show an even number of sunken portions, namely six sunken portions in FIGS. 1-6 and twelve sunken portions in FIGS. 7-9. As previously mentioned, the number of sunken portions may be selected from prime numbers, preferably from 5, 7, 11 and 13; FIG. 10 shows a capsule with eleven sunken portions. The choice of a prime number for the number of sunken portions results in an increased random positioning of the capsule within the receptacle of the brewing device where the capsule is housed to be pierced, with respect to the piercing elements present in the said receptacle. This increase in the random positioning of the capsule with respect to the piercing elements will reduce the possible bad functioning of the system.

Advantageously, according to a possible embodiment the thickness of the sunken portion 10 is equal to the thickness of the inlet wall 3 and/or of the lateral wall 2 outside said sunken portion, although other thicknesses can be adapted, accordingly to the specifications of the material used for the manufacturing of the capsule. As already mentioned above, in the present disclosure the expression "thickness of the sunken portion" is intended as the thickness of the section of the capsule wall in correspondence of the sunken portion, and in particular as the thickness of the at least one surface 12 of the sunken portion 10 that connects the inlet wall and the lateral wall of the capsule.

In the embodiments shown in the figures, the thickness of the sunken portion 10 is equal to the thickness t1 (see FIGS. 2 and 5) of the inlet wall 3 and of the upper portion 2b of the lateral wall 2 and is 0.25 mm. As already mentioned above, the thickness t1 (and also the thickness of the sunken portion) may be comprised in the range 1.5 mm-0.15 mm.

Advantageously the sunken portions 10 provided on the capsule surface on both the lateral wall 2 and the inlet wall 3 provide an effective reinforcement of the capsule thus avoiding undesired deformation thereof by piercing means of the brewing device, without the need of ribs produced by an addition of material, that is a thicker portion of the surface of the capsule, in correspondence of the inlet wall and/or of the lateral wall.

In fact, as already mentioned above, the at least one piercing area 30 of the inlet wall 3 is provided between the vertex of the inlet wall 3, corresponding to the central axis A of the capsule and the sunken portions 10 connecting areas of the inlet wall with areas of the lateral walls. Preferably, the at least one piercing area 30 of the inlet wall 3 is provided between said central axis A of the capsule and the end part 10a of the at least one sunken portion 10 on the inlet wall 3.

It has to be noted that the expression "end part" of the sunken portion 10 is used herein to indicate where the sunken portion 10 ends on the inlet wall 3, i.e. the part that is closer to central axis A of the capsule, shown with reference 10a in the figures. The side of the sunken portion opposite to end 10a is end 10b, that is located on the lateral wall 2; surface 12 connects end parts 10a and 10b.

According to another possible embodiment, not shown in the figures, the thickness of said piercing area 30 is lower than the thickness of the inlet wall 3 outside the piercing area 30.

Moreover, according to a possible embodiment (not shown in the figure), the one or more piercing area 30 forms at least one circular line or at least one annular path. It has to be noted that the circular line or the annular path can be continuous or discontinuous, i.e. forming one or more discrete piercing portions arranged along a circular line or an annular path.

Moreover, the sunken portions 10 provided on the capsule surface on both the lateral wall 2 and the inlet wall 3 also provides, in comparison to designs bearing the same mass of material, a more solid construction for the body of the capsule, which in turn proves advantageous during bulk storage or manipulation of the capsule by the filling machine or by the end-user.

According to other possible embodiments of the capsule according to the present invention, the thickness of the inlet wall and/or of said at least one sunken portion 10 is equal or reduced with respect to the thickness of the lateral wall 2.

In the embodiment shown in the FIGS. 1-10, the thickness of the inlet wall 3 is equal to the thickness of the sunken portion 10, i.e. the thickness of the surfaces 12, 12', and is equal to the thickness of upper portion 2b of the lateral wall 2 below the peripheral end 2c. In fact, independently from the thickness of the lateral wall 2, that could be also variable along its extension between the inlet wall and the lower wall, at least portion 2b of the lateral wall, between peripheral end 2c and junction lines 7, can have the same thickness of the inlet wall 3 and/or of the sunken portion 10.

In the exemplary embodiment shown in the figures, lower wall 4, i.e. the outlet wall, or the wall comprising the outlet from which the beverage exits the capsule, is a separate element which is connected to the lower portion of the capsule body 5, in order to close the capsule.

Any suitable constraint means of the lower wall 4 to the capsule body 5 can be used, and in other possible embodiments the lower wall 4 may be produced in one piece with the capsule's lateral wall.

Moreover, the lower wall may be produced in different material with respect to the capsule material, for example, the lower wall 4 may be a preferably non porous membrane, for instance an aluminium or a laminated foil, preferably a laminated foil including aluminium. Other suitable materials are a paper filter, a non woven fabric or a cap in thermoplastic or similarly rigid or semirigid material provided with holes, as already known in other capsules for the production of beverage.

According to known alternative embodiments, the outlet means may comprise one or more opening on the surface of the capsule, self-perforating elements that are broken under mechanical and/or pressure force acting on the capsule, or one or more holes that are produced by piercing means of the brewing device. Alternatively, outlet means may include open passages.

In the embodiment shown in the FIGS. 1-6 in the lower wall 4 are arranged outlet means 13, i.e. elements allowing the extraction of the brewed beverage from the capsule.

In the shown embodiment according to FIGS. 1-6, the capsule is provided with outlet means in the form of one self-perforating element 13 located on lower wall 4. The self-perforating element 13 is protruding from the lower surface of bottom wall 4, and is defined by grooves, or lines with reduced thickness, that are breakable under the action of the mechanical force exerted by the brewing device and/or the force exerted by the water fed into the capsule. This type of self-perforating elements is described in detail in application WO2007/063411, in the name of the present applicant, to which reference is made for further details. The shown embodiment has one, centrally located, element 13 forming a central outlet for the brewed in the form of a circumference; other embodiments can have a plurality of smaller outlets located in different positions, e.g. peripherally or radially.

Another type of outlet means has a plurality of protrusions, but the reduced thickness periphery of the rib is replaced by a cut area of the wall, along three sides of the outlet, the hinge portion being still present; additionally, in this embodiment the outlets can protrude both outwardly and inwardly with respect to wall 4. It has to be noted that the above mentioned outlet elements can be opened under the action of the mechanical force, or by means of the brewing liquid pressure, or as a result of the combined action of the brewing liquid pressure with the mechanical force exerted by the brewing device, or by hydraulic force exerted by the pump.

Other types of outlet means can be provided, i.e. the extraction of the beverage from the capsule can be obtained, for example, by perforating the capsule by suitable piercing means of the brewing device; in another embodiment, the outlet means is a water-soluble membrane.

According to a possible embodiment the capsule is produced in food-grade materials, for example polypropylene or PLA (polylactic acid), that is also resistant both to high temperature and pressure of the brewing liquid injected in its inside during the beverage preparation process or aptly softening under typical operating temperatures, in order to increase the sealing properties of the sealing means usually, but not necessarily, manufactured in the same plastic part, such as in the case of materials and methods readily available to the skilled in the art.

Moreover, as shown in the FIGS. 2, 4, 5 and 8, the capsule 1 may be provided with a plurality of ribs 8 protruding from the internal surface of the inlet wall 3. The ribs 8 are preferably arranged in a radial manner from the central portion of the inlet wall 3, substantially from the central axis A. Ribs 8 provided in the central part of the internal surface of the inlet wall are visible in FIG. 9.

It has to be noted that, in the embodiment of the capsule provided with such ribs 8, the one or more piercing area 30 is preferably arranged between the sunken portions 10 and the ribs 8. More in detail, the one or more piercing area 30 are arranged on the inlet wall 3 between the end part 10a of the sunken portion 10 and the end part 8a of the ribs 8.

As already mentioned above, the thickness of the piercing area 30 can be lower than the thickness of the inlet wall 3 outside the piercing area 30.

Advantageously, by providing one or more piercing area 30 between the sunken portions 10 and the ribs 8 arranged in correspondence of the central axis A, a reliable and effective perforation of the inlet wall can be obtained.

Furthermore, as visible in the sectional views of FIGS. 2, 3 and 8, the capsule is provided with vertical lugs 9 protruding from the internal surface of the lateral wall 2 and intended to impede the capsules from stacking during the production process. Thickness, shape and radius of such lug(s) will vary depending on the chosen manufacturing methods, to be selected amongst the ones mentioned earlier, as it can easily inferred by the skilled in the art.

In the shown exemplary embodiment, a sealing element 20 is provided on the flange-like rim 21 of the capsule, i.e. the portion of the capsule designed to be brought in contact with the receptacle, and in particular with the lower edge of the receptacle, i.e. the pressing portion of the receptacle, for providing the sealing engagement.

Preferably the sealing member is produced in one piece with the capsule and is shaped as an element protruding from the flange-like rim 21 of the capsule.

The invention claimed is:

1. A capsule for the preparation of a beverage from a brewing device, said capsule comprising:
    a lateral wall, an inlet wall and a lower wall forming a hollow body where a brewing product is contained and having a central axis, said inlet wall extending from a peripheral end of the lateral wall towards said central axis,
    wherein said lateral and inlet walls of the capsule comprise at least one sunken portion, said sunken portion extending on both said lateral wall and said inlet wall,
    wherein said at least one sunken portion corresponds to a protrusion inside the hollow body of the capsule, and said at least one sunken portion is provided on said lateral and inlet walls to connect together said lateral and inlet walls,
    wherein said at least one sunken portion comprises a surface forming an additional wall that is angled with respect to both lateral and inlet walls and with respect to said central axis of the capsule, and said surface connects said lateral wall to said inlet wall,
    wherein said surface lies on a plane that extends from below the peripheral end of said lateral wall to said inlet wall or said surface includes a segment that extends in a straight line from below the peripheral end of said lateral wall to said inlet wall so that the surface along the segment does not change an inclination with reference to the central axis of the capsule,
    wherein said inlet wall comprises at least one piercing area for being pierced by the brewing device provided entirely between said central axis of the capsule and an end of said
    at least one sunken portion and said piercing area is an annular path such that the piercing area does not extend to the central axis of the capsule,
    and
    wherein said inlet wall includes a planar portion that passes through the central axis and extends radially outward from the central axis, the planar portion is an uppermost part of
    the inlet wall, and at least part of the at least one piercing area extends below the planar portion of the inlet wall.

2. A capsule according to claim 1, wherein said sunken portion has a shape that is a prism or a portion of a prism.

3. A capsule according to claim 1, wherein said at least one surface of said sunken portion directly connects areas of the lateral and inlet walls that are spaced from an edge between said lateral and inlet walls.

4. A capsule according to claim 2, wherein said sunken portion or said at least one surface of said sunken portion forms an acute angle with respect to said central axis of the capsule, said acute angle being in a range of 10°-65°.

5. A capsule according to claim 1, wherein said at least one sunken portion is radially arranged with respect to the central axis of the capsule.

6. A capsule according to claim 1, further comprising a plurality of sunken portions arranged with constant spacing along said peripheral end of the lateral wall, to provide a corrugation or undulation of portions of both the inlet and lateral walls.

7. A capsule according to claim 1, wherein an angle formed between said lateral wall and said inlet wall at said peripheral end of said lateral wall is equal to or greater than 90°.

8. A capsule according to claim 1, wherein a number of sunken portions is selected from prime numbers.

9. A capsule according to claim 1, wherein a thickness of said sunken portion is equal to a thickness of the inlet wall and of the lateral wall outside of said sunken portion.

10. A capsule according to claim 1, wherein a thickness of the inlet wall and/or of said at least one sunken portion is reduced with respect to a thickness of the lateral wall outside of said sunken portion.

11. A capsule according to claim 1, wherein a thickness of at least a portion of the lateral wall below said peripheral end is equal to a thickness of said inlet wall and/or of the said at least one sunken portion.

12. A capsule according to claim 1, wherein a thickness of said lateral wall is not constant between the inlet wall and the lower wall.

13. A capsule according to claim 1, wherein a thickness of said piercing area is lower than a thickness of the inlet wall outside said piercing area.

14. A capsule according to claim 1, wherein a barrier layer is provided on or within said hollow body of the capsule to prevent or reduce gas transmission across the hollow body.

15. A system for preparing a beverage, comprising: a capsule according to claim 1 and a brewing device comprising piercing means
arranged along a predetermined path for perforating said capsule to inject a brewing liquid into said capsule,
wherein said inlet wall of the capsule comprises at least one piercing area on said inlet wall, said at least one piercing area being contacted and perforated by said piercing means of said brewing device.

16. A system according to claim 15, wherein said at least one piercing area is arranged along a path corresponding to the path along which said piercing means of the brewing device perforate said inlet wall.

17. A capsule according to claim 1, wherein said sunken portion has a shape that is selected from a parallelepiped, a cylinder, a triangular or an hexagonal prism.

18. A capsule according to claim 4, wherein said acute angle is in the range of 30°-50°.

19. A capsule according to claim 4, wherein said acute angle is in the range of 40°-50°.

20. A capsule according to claim 1, wherein an angle formed between said lateral wall and said inlet wall at said peripheral end of said lateral wall is greater than 90°.

21. A capsule according to claim 1, wherein an angle formed between said lateral wall and said inlet wall at said peripheral end of said lateral wall is 100° to 130°.

22. A capsule according to claim 8, wherein the number of sunken portions is selected from 5, 7, 11 and 13.

23. A capsule according to claim 1, wherein said sunken portion includes a first end on the inlet wall and includes a second end on the lateral wall, the first end being opposite to the second, and the second end extends further into the lateral wall from the peripheral end of the lateral wall than the first end extends into the inlet wall from the peripheral end of the lateral wall.

24. A capsule for the preparation of a beverage from a brewing device, said capsule comprising:
a lateral wall, an inlet wall and a lower wall forming a hollow body where a brewing product is contained and having a central axis, said inlet wall extending from a peripheral end of the lateral wall towards said central axis,
wherein said lateral and inlet walls of the capsule comprise at least one sunken portion, said sunken portion extending on both said lateral wall and said inlet wall,
wherein said at least one sunken portion corresponds to a protrusion inside the hollow body of the capsule, and said at least one sunken portion is provided on said lateral and inlet walls to connect together said lateral and inlet walls,
wherein said at least one sunken portion comprises a surface forming an additional wall that is angled with respect to both lateral and inlet walls and with respect to said central axis of the capsule, and said surface connects said lateral wall to said inlet wall,
wherein said surface lies on a plane that extends from below the peripheral end of said lateral wall to said inlet wall or said surface includes a segment that extends in a straight line from below the peripheral end of said lateral wall to said inlet wall so that the surface along the segment does not change an inclination with reference to the central axis of the capsule,
wherein said inlet wall comprises at least one piercing area for being pierced by the brewing device provided entirely between said central axis of the capsule and an end of said at least one sunken portion and said piercing area is an annular path such that the piercing area does not extend to the central axis of the capsule, and
wherein said inlet wall includes ribs located on an internal surface of the inlet wall, the ribs extending outward from the central axis.

25. A capsule according to claim 24, wherein the piercing area is arranged on the inlet wall between an end of the sunken portion and an end of the ribs.

26. A capsule according to claim 1, wherein said at least one sunken portion provided on said lateral wall does not extend below a half of a length of said lateral wall.

* * * * *